Sept. 29, 1925.

W. KLINE 1,555,587

METHOD AND APPARATUS FOR FORMING COMPRESSION INNER TUBES

Filed March 17, 1923

WALTER KLINE INVENTOR.

BY

Edwin J. Carter ATTORNEY.

Patented Sept. 29, 1925.

1,555,587

UNITED STATES PATENT OFFICE.

WALTER KLINE, OF CHILLICOTHE, OHIO, ASSIGNOR OF ONE-HALF TO FLORA DICKISON, OF CLEVELAND, OHIO, AND ONE-HALF TO LON A. MARK AND DANIEL F. MARK, BOTH OF WASHINGTON COURT HOUSE, OHIO.

METHOD AND APPARATUS FOR FORMING COMPRESSION INNER TUBES.

Application filed March 17, 1923. Serial No. 625,897.

*To all whom it may concern:*

Be it known that I, WALTER KLINE, a citizen of the United States of America, residing at Chillicothe, in the county of Ross and State of Ohio, have invented certain new and useful Improvements in Methods and Apparatus for Forming Compression Inner Tubes, of which the following is a specification.

My invention relates to a method and apparatus for forming compression inner tubes, and has to do particularly with the provision of a novel type of mandrel and forming structure for forming the tube and the corrugations on the tube, the corrugations so formed being effective to produce compression of the tube when it is inflated within a tire casing.

In the past, in the manufacture of compression inner tubes, it has been the practice to mold a series of variously shaped depressions in the wall of the inner tube. In other words, these molded depressions consist of deformed tube wall sections so that, in certain definite portions, the entire thickness or wall of the tube has been deflected and molded in various shapes and to various depths. This irregular shaping and deforming of the wall of the inner tube has, aside from resulting in structural difficulties, necessitated the use of expensive and intricate molding and forming equipment with the result that the relative cost of production of compression inner tubes over standard or plain tubes has been greatly increased.

My invention has to do primarily with the method of forming an inner tube upon a mandrel of novel contour and then applying pressure to the tube to cause it to assume and retain the contour of the mandrel to effect the formation of compression corrugations on the surface of the tube. This method of forming the compression corrugations on the surface of the tube is accomplished by means of an extremely simple and compact structure which comprises a mandrel for forming the general contour of the tube, means integral with the mandrel for forming corrugations on the tube and means for insuring a proper pressure upon the surface of the tube after it has been built up around the mandrel.

One of the objects of my invention is the provision of a novel mandrel and depressions on the surface of the mandrel of such form that a portion of the inner tube may be inserted into and caused to assume the shape of the depressions.

Another object of my invention has to do with the provision of a mandrel for forming the interior contour of the tube when the tube is built up around the mandrel and means for applying pressure to the exterior of the tube whereby the entire interior surface of the tube will be made to assume the exact contour of the mandrel. In this case, the mandrel will be effective to shape the interior and exterior contour of the tube with the result that the exterior contour of the tube will be smooth while the interior contour will be provided with compression producing corrugations. Furthermore, although the corrugations will be integral with the tube, they will in no way distort the normal general contour of the tube.

A still further object of my invention has to do with the provision of an inner tube mandrel adapted to shape the interior contour of the tube and to form corrugations on the interior of the tube, and which mandrel is of such form that the formed tube may be reversed when it is removed from the mandrel. The result is that the inner tube will be turned inside out so that the smooth outer surface will form the final interior of the tube and the corrugations formed by depressions in the mandrel will form projections on the exterior of the tube.

Various other features of my invention will be apparent as this description progresses and will be brought out in the claims appended thereto. The various objects of my invention are preferably obtained by the structure illustrated in the drawings wherein similar characters of reference designate corresponding parts and wherein Figure 1 is a side elevation of my novel mandrel and showing the preferred location of the corrugations on the surface thereof.

Figure 1:
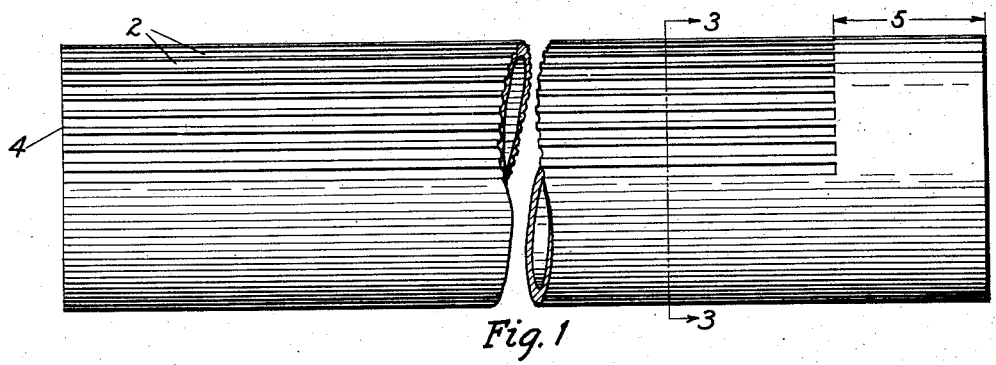

In the drawings, my novel tube forming apparatus is shown as comprising a hollow cylindrical shaped tube or mandrel 1. This mandrel is preferably straight sided and, as best shown in Figure 1, is provided with longitudinal corrugations or depressions 2 which extend parallel to the longitudinal axis of the mandrel.

Figure 2:
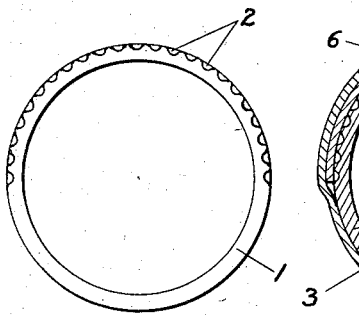
Figure 2 is an end elevation of the structure shown in Figure 1.

These corrugations 2 are preferably formed in the tread portion or upper half of the mandrel, as shown in Figure 2, and are relatively small in cross-section and formed close together. It will also be obvious that these corrugations may extend completely around the mandrel.

Figure 5:
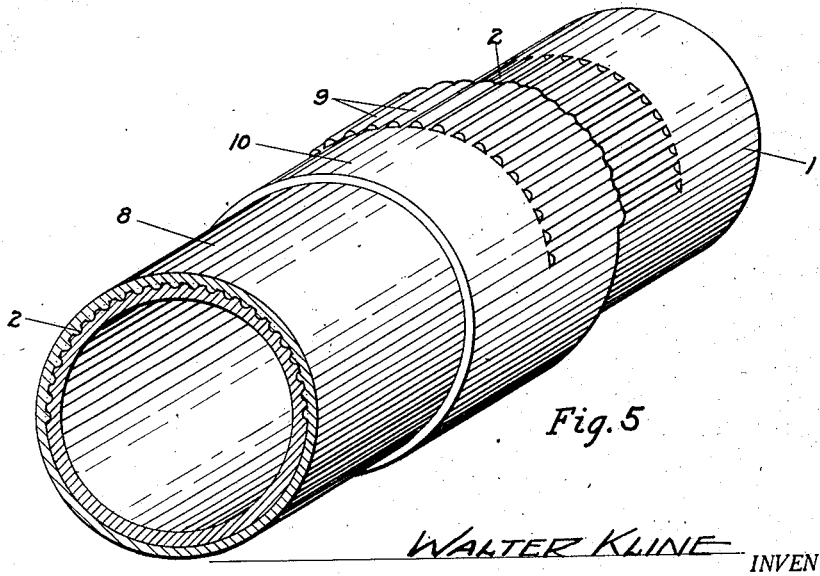
Figure 5 is a fragmentary perspective view of one end of my novel mandrel and showing the manner of removing a formed tube therefrom.

The mandrel 1 is preferably of the same length as the finished tube and of the sheets of raw rubber 3 which are built up around the mandrel to form the tube. The corrugations 2 extend flush with one end 4 of the mandrel but at the other end they are cut to within a distance 5 of the end of the mandrel. This smooth portion of the mandrel is effective to make a portion of one end of the tube plain, as shown in Figure 5.

Figure 3:
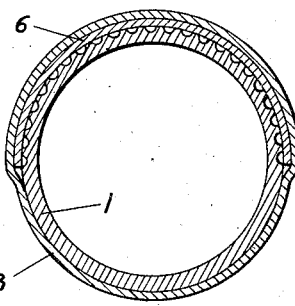
Figure 3 is a cross-section taken on line 3—3 of Figure 1 and showing in addition the preferred manner of building up the raw rubber around the mandrel prior to applying pressure to the tube.
Figure 4:
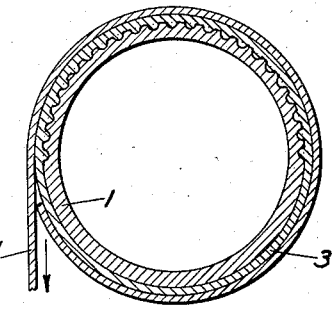
Figure 4 is a cross-sectional view similar to Figure 3 but showing the position of the tube after pressure has been applied and after vulcanization.

In order to provide sufficient rubber to form the corrugations on the tube, without distorting the surface of the tube, I have provided an additional sheet or sheets of rubber 6 (see Figure 3). This sheet is of such form that it will extend the full length and breadth of the corrugations 2, and of such size as to completely fill said corrugations 2' (see Figure 4). The raw rubber 3 and 6 is preferably of standard form and comprises a plurality of layers of rubber, placed one on top of the other, to form a multiple ply tube.

The built-up raw rubber is preferably made to conform with the contour of the mandrel by means of a suitable tape 7 which is wrapped around the tube to apply pressure to the exterior of the tube. It will be apparent that any means, such as a mold, may be used to apply pressure to the tube, but I prefer to use tape as shown, as I have found that this means of wrapping the tube results in a maximum amount of production.

In building up an inner tube the sheets of raw rubber 3 and 6 are laid out upon a suitable surface and the mandrel is rolled over the surface of the rubber, the rubber clinging to the mandrel during the rolling action. The resulting relative positioning of the layers of rubber and the mandrel is shown in Figure 3. The mandrel 1 is then held in a lathe or other suitable device and the tape 7 is wrapped around the built-up tube, considerable tension being applied during the wrapping, with the result that layers of rubber are compressed to conform with the smooth contour and the corrugations 2 of the mandrel.

When the raw tube is so formed about the mandrel, the tightly wrapped tube is subjected to the ordinary vulcanization process. After vulcanization the tape 7 is removed and the formed tube 8 is removed from the mandrel 1 by doubling the tube back and reversing it so that the corrugations 9, formed by the depressed corrugations 2, will be on the exterior or tread portion of the tube. The smooth portion 10 of the formed tube is then inserted in the other open end of the tube and the joint so formed is vulcanized in the ordinary manner.

It will be understood that the corrugations 2 in the mandrel may be any desired size or shape, so long as, when the tube is inflated in a tire casing, they will be effective to produce compression of the entire surface of the tube.

It will be seen that I have provided a novel tube forming structure which is of very simple and strong construction and which is adapted to form compression corrugations on the surface of an inner tube. It will further be noted that these corrugations are formed simultaneously with the forming of the tube, and with the result that I am able to produce a compression inner tube at substantially the same production cost as an ordinary non-puncture proof inner tube.

It will also be noted that the contour of this mandrel is adapted to determine the shape of the interior of the tube, and that when the tube is reversed the smooth exterior of the tube will assume the shape determined by the mandrel.

Obviously, my invention may take many different forms, in that the general shape of the mandrel, and the manner of building up and applying the raw rubber to the mandrel, may be changed in accordance with the form of the tire desired and the equipment desired.

It will also be obvious that the design of the depressions in the mandrel may take various forms, so that the corrugations in the surface of the tube may be formed to run or extend in a transverse or any other desired direction. All such changes, however, are within the scope of the appended claims.

Having thus described my invention, what I claim is—

1. The method of forming inner tubes on a mandrel one side of which is longitudinally corrugated, which consists in applying a rubber coating to the corrugated portion of said mandrel, completely covering said mandrel by additional rubber, wrapping said tube, vulcanizing, and then removing said wrapper.

2. The method of making inner tubes which consists in applying the stock to a mandrel, substantially one-half of the circumference of which is corrugated, pressing said stock into said corrugations by wrapping, vulcanizing, and then removing said wrapper.

3. The method of forming inner tubes upon a mandrel having depressions on part of its surface, which consists in applying a rubber coating to the depressed portion of the mandrel, completely covering said mandrel by additional rubber, wrapping said tube, and then removing said wrapper.

4. The method of making inner tubes which consists in applying stock to a mandrel, substantially one-half of the circumference of which is provided with depressions, pressing said stock into said depressions by wrapping, vulcanizing, and then removing said wrapper and reversing the tube.

5. The method of forming inner tubes which consists in forming the tube about a mandrel having depressions in part of its surface, applying a surplusage of stock to a part of the mandrel, applying pressure to said tube to force a part of said stock into said depressions, vulcanizing and reversing the formed tube.

6. Apparatus for forming compression inner tubes comprising a mandrel having longitudinal flutes around substantially half of its circumference.

7. Apparatus for forming inner tubes of the type described comprising a longitudinally fluted mandrel having one plain end.

8. Apparatus for forming compression inner tubes comprising a mandrel having spaced depressions formed around substantially half of its circumference.

9. Apparatus for forming inner tubes of the type described comprising a mandrel having depressions formed in its surface, and a smooth portion positioned between said depressions and one end of the mandrel.

10. Apparatus for forming inner tubes comprising a mandrel substantially circular in cross-section and having its outer surface provided with a plurality of spaced depressions, said depressions being interrupted by smooth surface extending circumferentially and longitudinally of the mandrel.

11. Apparatus for forming inner tubes comprising a mandrel substantially circular in cross-section and having its outer surface provided with a plurality of depressions extending approximately half-way around its circumference and a smooth portion extending completely around its circumference.

In testimony whereof I hereby affix my signature.

WALTER KLINE.